US012760569B2

(12) United States Patent
Yang et al.

(10) Patent No.: US 12,760,569 B2
(45) Date of Patent: Oct. 13, 2026

(54) HINGE DESIGN

(71) Applicant: Burks Industries, LLC, Atlanta, GA (US)

(72) Inventors: Na Yang, Atlanta, GA (US); Benjamin H. Burks, III, Atlanta, GA (US)

(73) Assignee: Burks Industries, LLC, Atlanta, GA (US)

( * ) Notice: Subject to any disclaimer, the term of this patent is extended or adjusted under 35 U.S.C. 154(b) by 21 days.

(21) Appl. No.: 18/939,167

(22) Filed: Nov. 6, 2024

(65) Prior Publication Data

US 2025/0146340 A1 May 8, 2025

Related U.S. Application Data

(60) Provisional application No. 63/597,194, filed on Nov. 8, 2023.

(51) Int. Cl.
*E05F 1/08* (2006.01)
*E05D 3/02* (2006.01)
(Continued)

(52) U.S. Cl.
CPC ............... *E05D 7/04* (2013.01); *E05D 3/022* (2013.01); *E05D 2007/0469* (2013.01);
(Continued)

(58) Field of Classification Search
CPC ........... E05Y 2900/20; E05Y 2900/202; E05Y 2900/204; E05Y 2900/208; E05Y 2201/20; E05Y 2201/21; E05Y 2201/261; E05Y 2201/11; E05Y 2201/258; E05Y 2201/46; E05Y 2201/474; E05F 5/006; E05F 5/065; E05F 5/02; E05F 5/027; E05F 5/10; E05D 11/0054; E05D 11/1021; E05D 11/1042; E05D 11/105; E05D 11/1064; E05D 7/04; E05D 7/0407; E05D 7/0415; E05D 7/0423; E05D 7/1083; E05D 7/12; E05D 7/123; E05D 7/125; E05D 3/142; E05D 3/02; E05D 5/065; E05D 2007/0492;
(Continued)

(56) References Cited

U.S. PATENT DOCUMENTS 4,554,706 A * 11/1985 Rock ........................ E05D 5/046 16/382
5,577,296 A * 11/1996 Grass ...................... E05D 7/123 16/382
(Continued)

FOREIGN PATENT DOCUMENTS

CN 120026798 A * 5/2025 ................ E05F 5/10

*Primary Examiner* — Chuck Y Mah
(74) *Attorney, Agent, or Firm* — Nixon Peabody LLP

(57) ABSTRACT

An adjustable hinge for mounting a door on a cabinet frame that comprises a hinge cup and arm link having a first end and a second end. The first end is coupled to the hinge cup and configured to pivot relative to the hinge cup between an open position and closed position. A bottom plate is adjustably coupled to the arm link by a first adjustment screw. A cover plate is adjustably coupled to the bottom plate by a second adjustment screw. A lower surface of the cover plate is disposed substantially parallel to an upper surface of the bottom plate, and a majority of the area of the lower surface of the cover plate directly contacts the upper surface of the bottom plate.

8 Claims, 14 Drawing Sheets

(51) Int. Cl.
*E05D 7/04* (2006.01)
*E05F 3/20* (2006.01)

(52) U.S. Cl.
CPC ........ *E05D 2007/0492* (2013.01); *E05F 3/20* (2013.01); *E05Y 2900/20* (2013.01)

(58) Field of Classification Search
CPC ...... E05D 2007/128; E05D 2207/0476; E05D 2207/0484; E05D 2207/1094
See application file for complete search history.

(56) References Cited

U.S. PATENT DOCUMENTS

| | | | | | |
|---|---|---|---|---|---|
| 6,807,713 | B2 * | 10/2004 | Rock | E05D 7/0415 | 16/382 |
| 6,904,645 | B1 * | 6/2005 | Lautenschlager | E05D 7/0415 | 16/382 |
| 8,650,711 | B1 * | 2/2014 | Chen | E05F 5/006 | 16/296 |
| 9,163,447 | B1 * | 10/2015 | Liang | E05F 5/006 | |
| 9,874,049 | B1 * | 1/2018 | McGregor | E05D 5/065 | |
| 2002/0000021 | A1 * | 1/2002 | Domenig | E05D 7/0423 | 16/240 |
| 2005/0251961 | A1 * | 11/2005 | Liu | E05D 7/0415 | 16/242 |
| 2006/0137139 | A1 * | 6/2006 | Wu | E05D 7/0423 | 16/236 |
| 2011/0291538 | A1 * | 12/2011 | Brunnmayr | E05D 11/08 | 16/382 |
| 2012/0174338 | A1 * | 7/2012 | Wu | E05F 5/08 | 16/297 |
| 2013/0145580 | A1 * | 6/2013 | Brunnmayr | E05F 5/02 | 16/84 |
| 2015/0337577 | A1 * | 11/2015 | Peer | E05D 7/0415 | 16/237 |
| 2017/0107749 | A1 * | 4/2017 | McGregor | E05F 5/006 | |
| 2017/0254128 | A1 * | 9/2017 | Ng | E05D 3/02 | |
| 2018/0155974 | A1 * | 6/2018 | Kirenci | E05F 5/02 | |
| 2018/0209196 | A1 * | 7/2018 | Migli | E05F 5/006 | |
| 2018/0355651 | A1 * | 12/2018 | Liang | E05D 11/00 | |
| 2020/0173216 | A1 * | 6/2020 | Salice | E05D 5/065 | |
| 2022/0349227 | A1 * | 11/2022 | Gstrein | E05D 7/0415 | |
| 2023/0304343 | A1 * | 9/2023 | Salice | E05D 5/065 | |
| 2025/0043612 | A1 * | 2/2025 | Wu | E05F 3/06 | |

* cited by examiner

HINGE DESIGN

CROSS-REFERENCE TO RELATED APPLICATIONS

This application claims the benefit of U.S. Provisional Patent Application No. 63/597,194 filed Nov. 8, 2023, the entire disclosure of which is incorporated herein by reference in its entirety.

TECHNICAL FIELD

The present disclosure relates to adjustable hinges, and more specifically, to overlay adjustable soft close hinges commonly used in cabinetry.

BACKGROUND

Adjustable hinges are well-known in the field of cabinetry. Conventional hinges commonly provide in/out, up/down and overlay adjustments. However, the adjustment features of such hinges are often unnecessarily complex and limited in-terms of available adjustment ranges. Further, multiple conventional hinge designs may be needed for use with doors of different thicknesses. Conventional adjustment features also unnecessarily complicate assembly and installation. Therefore, a need exists for an adjustable hinge with improved adjustment ranges that is easy assemble and install. A need also exists for an adjustable hinge that can be used in doors of different thicknesses.

Figure 1A:
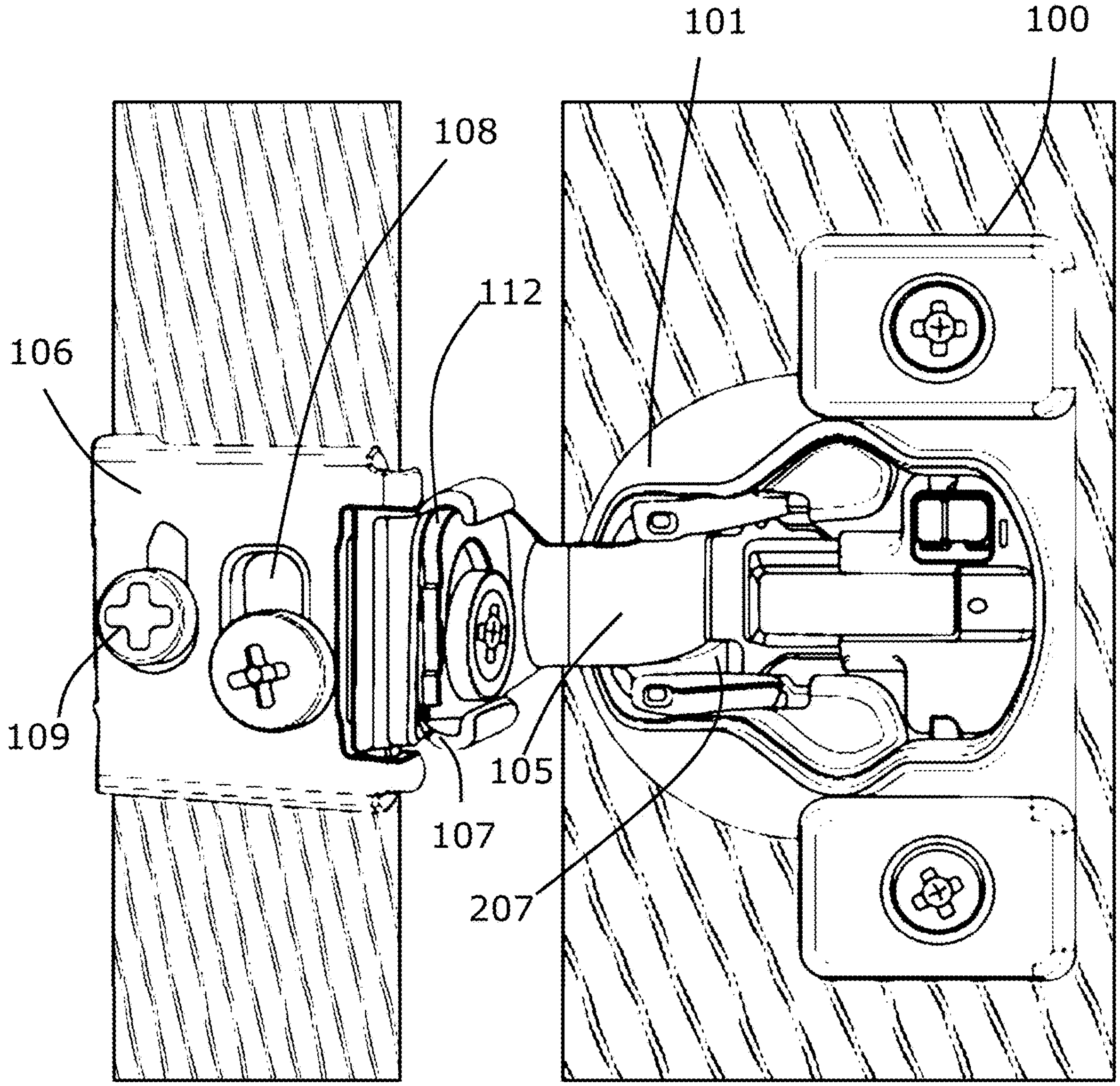
FIG. 1A illustrates an adjustable hinge installed to a door and frame, according to some implementations of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Figure 1B:
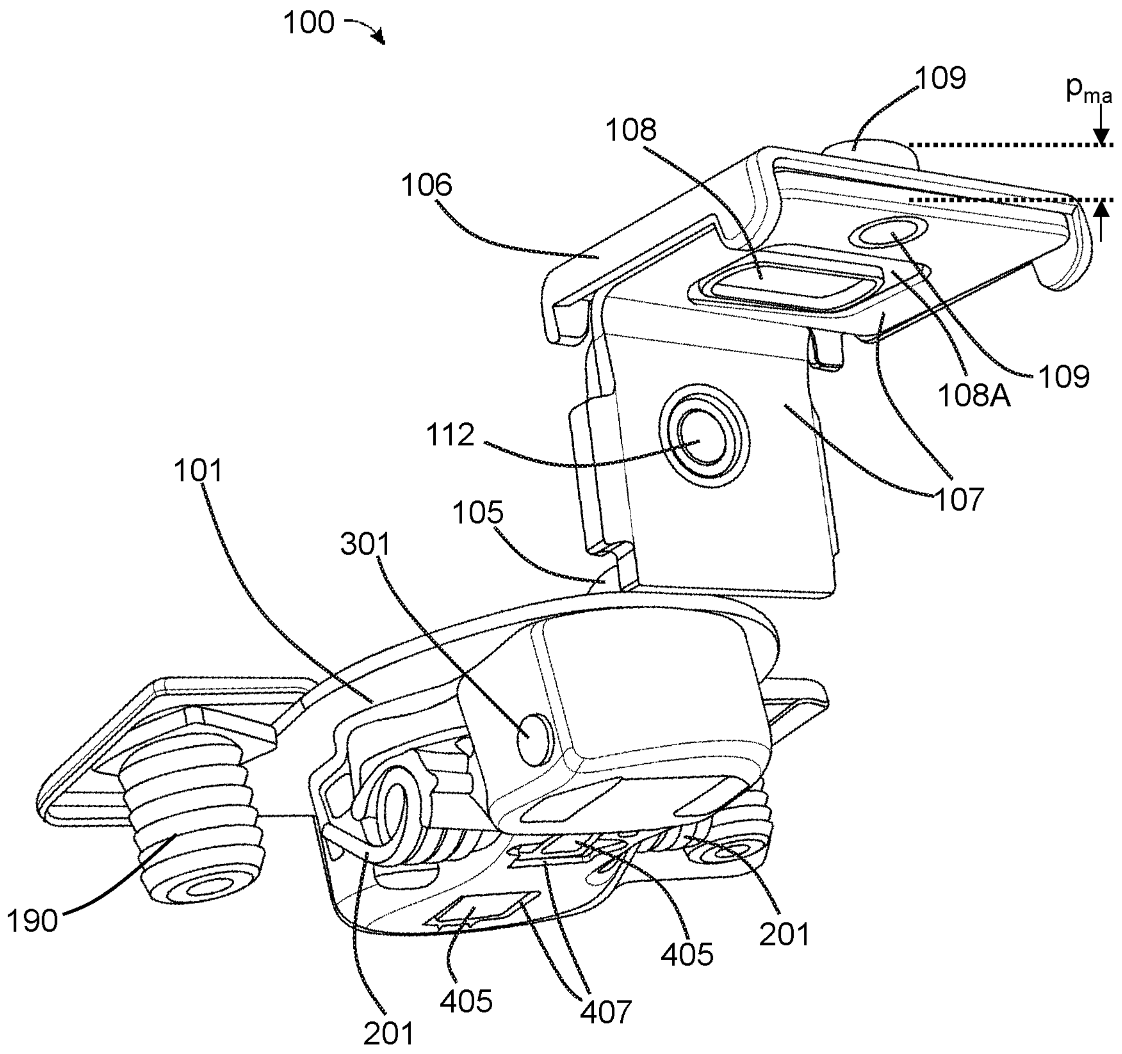
FIG. 1B illustrates a perspective view of the adjustable hinge of FIG. 1A.

FIGS. 1A-1B illustrate a perspective view of an exemplary embodiment of an adjustable hinge 100 installed to a door and a frame, according to some implementations of the present disclosure. In some implementations, the adjustable hinge 100 is made from stamped steel and can be nickel plated. In some implementations, the adjustable hinge 100 has a hinge cup with cup depth (de) of 11.4 mm, an opening angle $\alpha$ of 103 degrees and tab distance (K) from the edge of the door of about 2.5 mm to 4 mm. Embodiments of the adjustable hinge 100 may be installed on a door with thickness ranging from 14 mm to 19.1 mm, and can be coupled with an angle restrictor clip (providing, for example, an 84-degree restriction) in a manner well-known to those of skill in the art.

Figure 2:
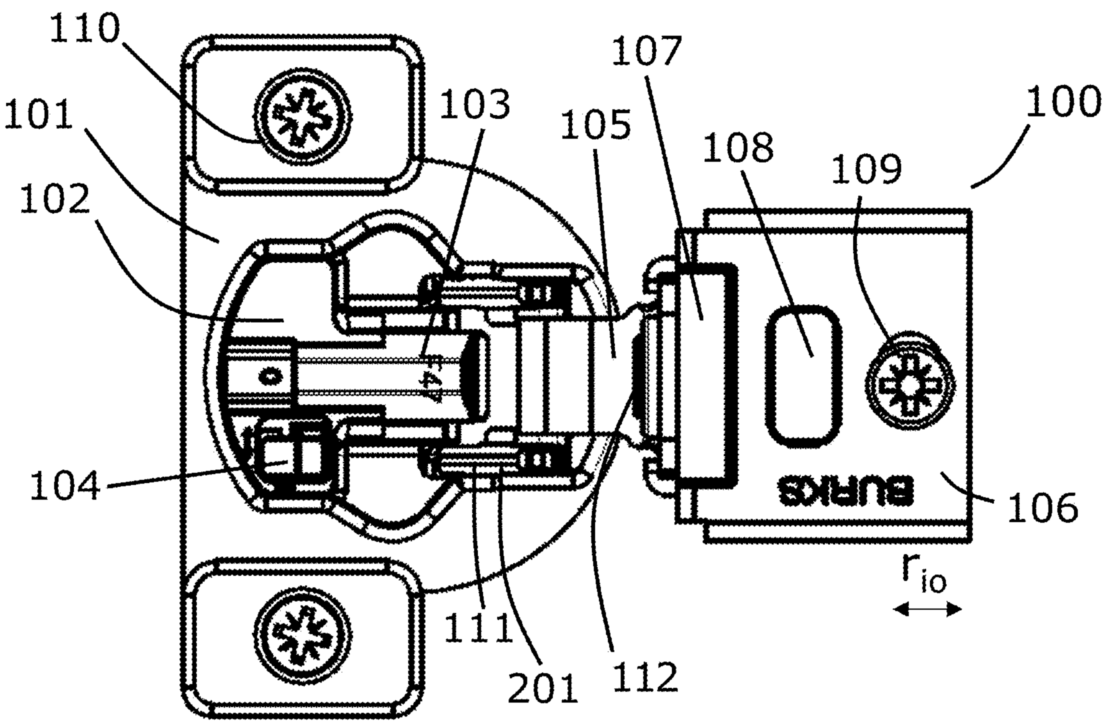
FIG. 2 illustrates a top view of the adjustable hinge in an open position, according to some implementations of the present disclosure.

FIG. 2 illustrates a top view of the adjustable hinge 100 in an open position, according to some implementations of the present disclosure. The adjustable hinge 100 includes a hinge cup 101 that can be installed to a door using as provided in FIGS. 1A-1B. The door can be drilled to accommodate the shape of the hinge cup 101. Fasteners 110 and dowls 190 may be used to secure the hinge cup 101 to the door. The adjustable hinge 100 further includes a substantially "L" shaped bottom plate 107 and cover plate 106. The bottom plate 107 and the cover plate 106 are coupled using mounting adjustment screw 109. The bottom plate 107 and the cover plate 106 have a mounting hole 108 for securing the adjustable hinge 100 to a frame as provided in FIG. 1A.

Figure 12A:
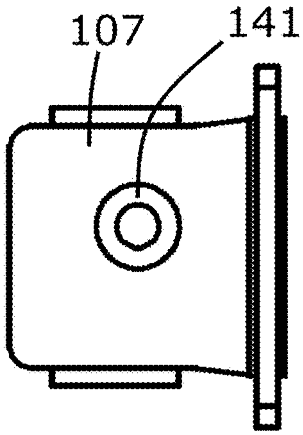
FIGS. 12A-12D illustrate views of a bottom plate of the adjustable hinge, according to some implementations of the present disclosure.
Figure 12B:
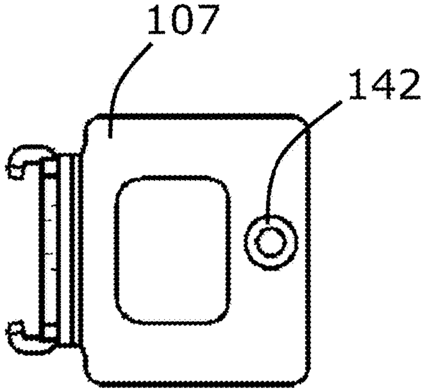
Figure 12C:
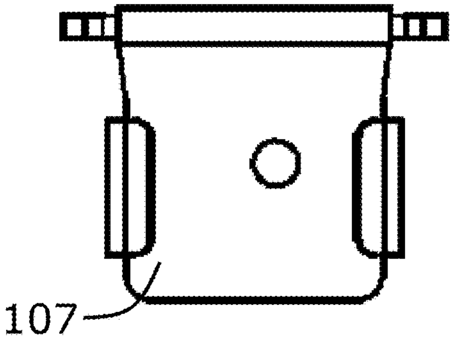
Figure 12D:
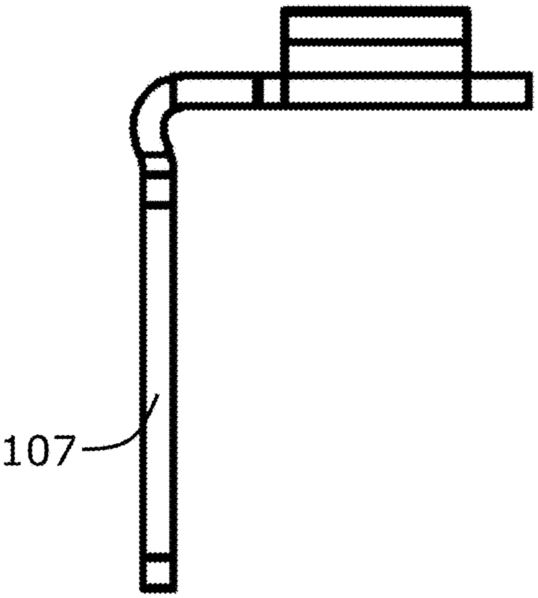

The hinge cup 101 and the bottom plate 107 are coupled to each other via a hinge arm link 105. The hinge arm link 105 has an axis of rotation situated within the hinge cup 101 at a first end. The hinge arm link 105 is attached to the bottom plate 107 via overlay adjustment screw 112. In some implementations, the overlay adjustment screw 112 and the mounting adjustment screw 109 are elliptical screws that provide for adjusting the adjustable hinge 100. Each of the overlay and mounting adjustment screws 112, 109 include respective posts 112*p*, 109*p* and shafts 112*s*, 109*s*. Distal ends of the posts opposite the screw heads are received by and stamped into respective apertures 141, 142 in the bottom plate 107 (most clearly shown in FIGS. 12A and 12B), which causes the posts to be bradded-in, and prevents the screws from falling out.

Figure 3:
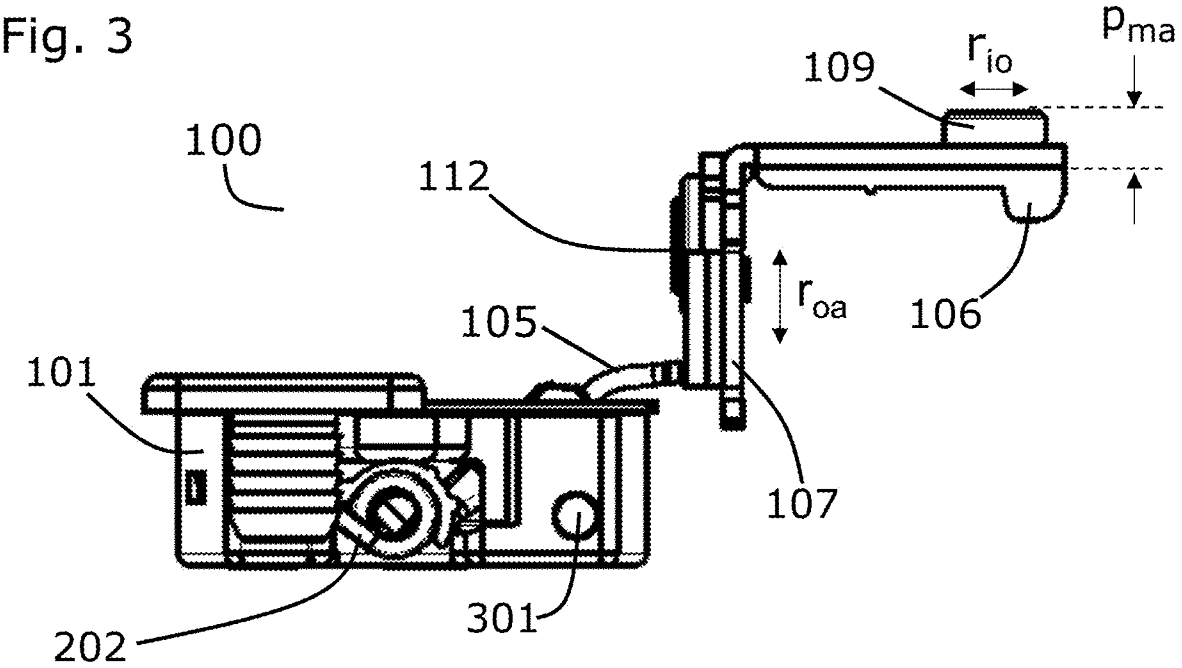
FIG. 3 illustrates a side view of the adjustable hinge in the open position, according to some implementations of the present disclosure.
Figure 15A:
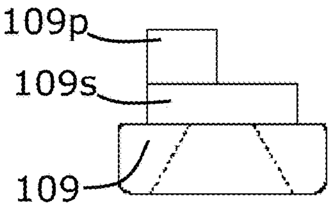
FIGS. 15A-15C illustrate views of an elliptical adjustment screw used for the in/out adjustment of the adjustable hinge, according to some implementations of the present disclosure.
Figure 15B:
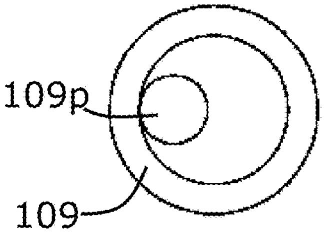
Figure 15C:
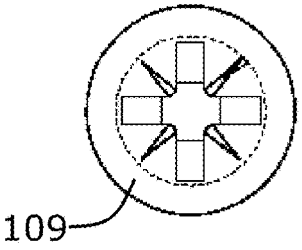

FIG. 2 and FIG. 3 illustrate the in/out adjustment assembly, which relies on mounting adjustment screw 109 (also shown in FIG. 15A). Mounting hole 108, shown in FIG. 2, facilitates height adjustment.

Figure 10A:
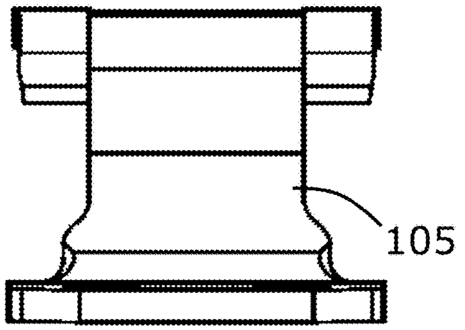
FIGS. 10A-10C illustrate views of a hinge arm link of the adjustable hinge, according to some implementations of the present disclosure.
Figure 10B:
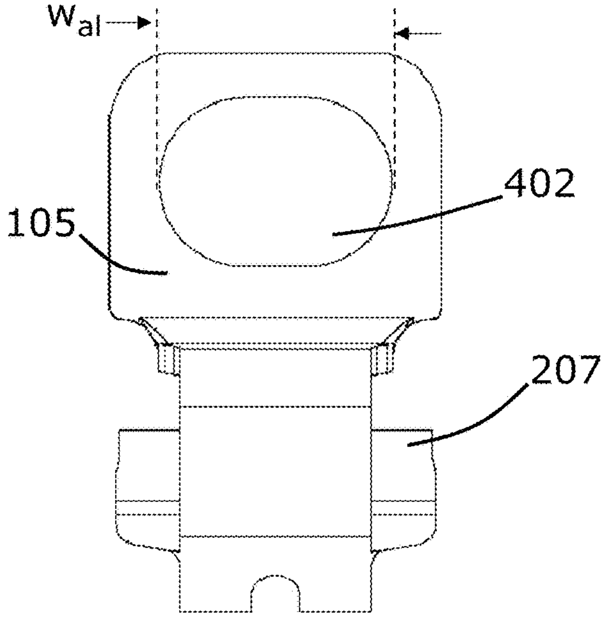
Figure 10C:
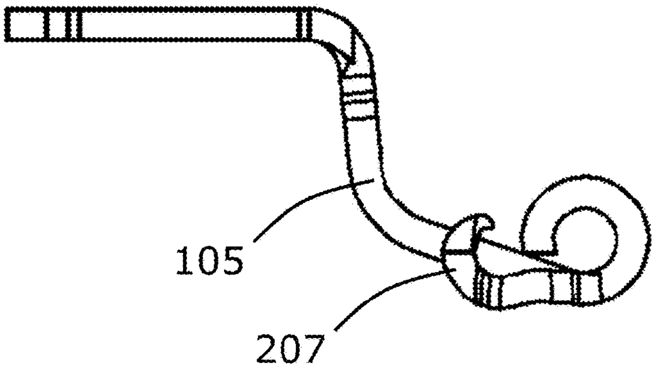

In an embodiment, a portion of the hinge arm link 105 extends into the hinge cup 101 and terminates in a curl that winds around a first pin or rivet 301 secured in the hinge cup 101, thereby permitting the hinge arm link 105 to pivot relative to the hinge cup 101. As shown in FIGS. 1, 10B, and 10C, opposing projections 207 are formed at the end of the curl. Opposing coil springs 201 are secured to the cup. Each coil spring 201 includes a leg 111, which may be received by a leg cover 610. The leg 111 and leg cover extend toward and engage a projection 207, while the opposing end of the coil spring 201 is secured in a hole on the side of the hinge cup 101. The interaction between the legs of the coil spring 201 and projections 207 effectuates opening and closing functions. In particular, as the arm link 105 pivots from the closed position toward the open position, the free ends of the legs pass over portions of the projections generating a moment force which biases the arm towards the open position. Likewise, as the arm link 105 pivots from the open position toward the closed position, the free ends of the legs pass over portions of the projections generating a moment force which biases the arm towards the closed position. In an embodiment, sleeves (e.g., left spring cover and/or right spring cover of FIGS. 12 and 13) may be placed over the ends of each leg, such as those shown in FIGS. 1A-1B, to reduce wear. In such an embodiment, the sleeves, rather than the spring legs, directly contact the projections.

Shallow Cup

Figure 5:
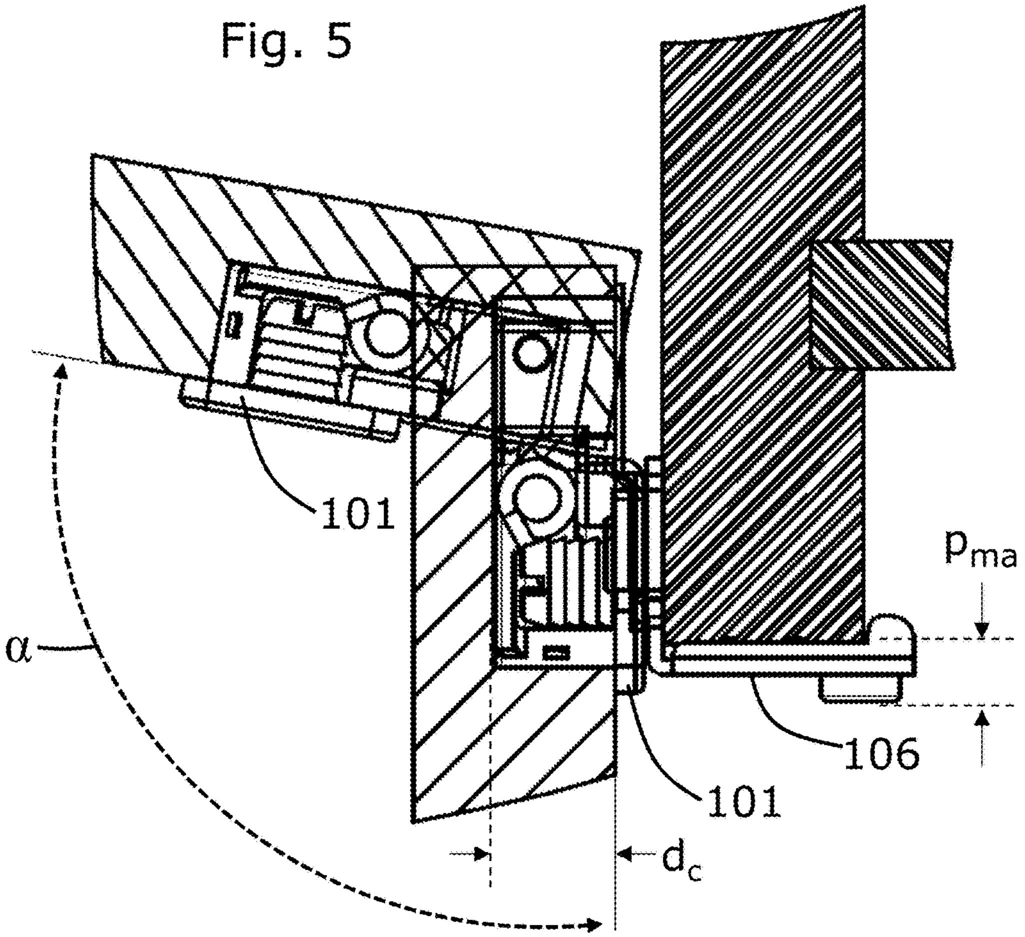
FIG. 5 illustrates a side view of the adjustable hinge transitioning between the open position and a closed position, according to some implementations of the present disclosure.
Figure 11A:
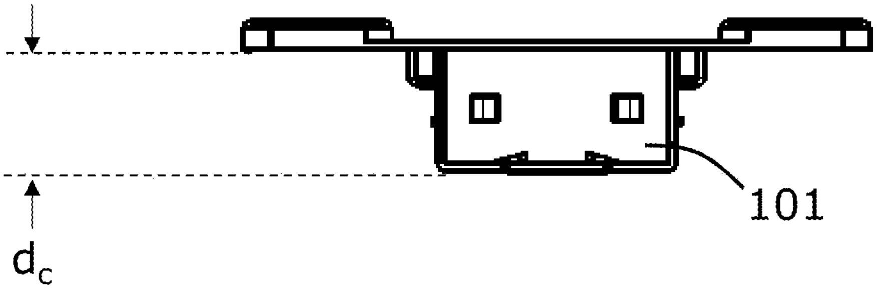
FIGS. 11A-11C illustrate views of a hinge cup, according to some implementations of the present disclosure.
Figure 11B:
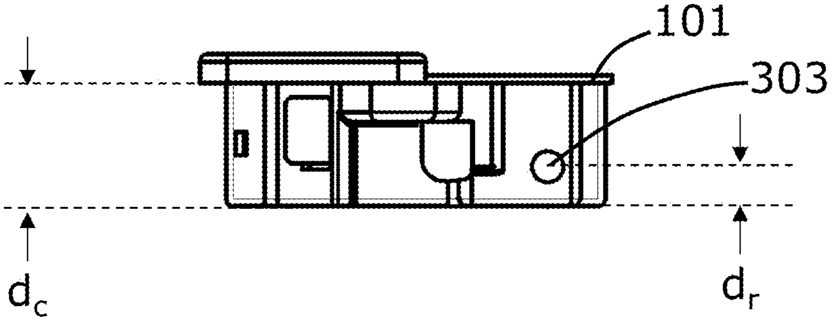
Figure 11C:
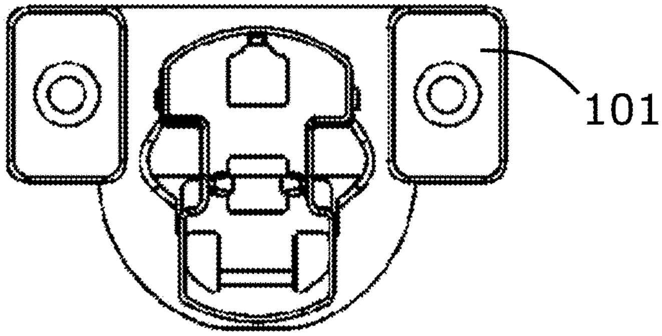

In an embodiment, the adjustable hinge 100 includes a hinge cup that is shallower in depth compared to conventional hinges, while still maintaining versatile compatibility with different door thicknesses. In some implementations, and as shown in FIG. 5, FIG. 11A and FIG. 11B, the hinge cup 101 has a shallow cup depth de of 11.4 mm, when measured from the bottom of the cup to the rim. This permits the cup 101 to be received by a bore having a drilling depth of only about 11.5 mm into the door, as shown in FIG. 5. Under this arrangement, the adjustable hinge 100 can accommodate door thicknesses ranging from 14 mm to 19.1 mm, thereby offering designers the flexibility to provide a wider variety of door styles to satisfy diverse customer preferences.

Under conventional designs, two different hinges (one hinge having a shallow cup and the other having a deeper cup) are needed for use with a 14 mm door and a thicker 19.1 mm door. In particular, use of a conventional shallow cup hinge on a 19.1 mm door will not allow the door edge to clear the edge of the cabinet adjacent door when opening. Use of a conventional deeper cup hinge on a 14 mm door is also problematic, as the boring depth needed to accommodate the cup may pierce through the door front.

The shallow cup depth of the hinge of the present disclosure is made possible by, among other things, placing rivet 301 closer to the bottom of the hinge cup 101 when compared to conventional hinges. For example, as shown in FIGS. 11A and 11B, the rivet holes 303, which receive the rivet 301, are disposed approximately 3.7 mm above the bottom of the hinge cup 101 ($d_r$ in FIGS. 11A and 11B). The rivet 301 defines the axis of rotation of the hinge cup 101 (FIG. 5). Disposing the rivet 301 closer to the bottom of the hinge cup 101 also facilitates placing the axis of rotation at a location that can accommodate door thicknesses ranging from 14 mm to 19.1 mm. Conventional hinges with shallower cups have pivot axes that do not work with thicker doors because the edge of the door will hit the edge of the adjacent door when opened. Further, as most clearly shown in FIG. 1B, lower protrusions(s) 405 of the damper cover 102 may fit through apertures 407 in the bottom of the hinge cup to lower the positioning of the damper components relative to the bottom of the cup 101.

Overlay Adjustment Assembly

Figure 4:
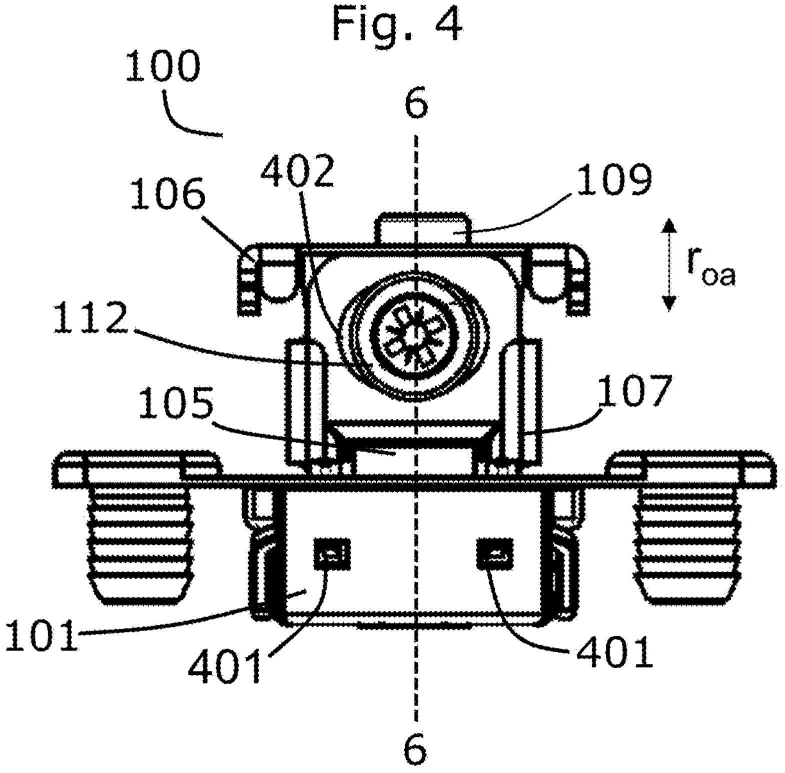
FIG. 4 illustrates a front view of the adjustable hinge in the open position, according to some implementations of the present disclosure.
Figure 14A:
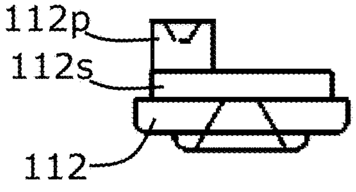
FIGS. 14A-14C illustrate views of an elliptical adjustment screw used for the overlay adjustment of the adjustable hinge, according to some implementations of the present disclosure.

FIGS. 3-4 illustrate components of the overlay adjustment, which relies on overlay adjustment screw 112 (also shown in FIG. 14A). The disclosed arrangement of overlay adjustment screw 112, arm link 105, and bottom plate 107 (shown, for example, in FIG. 1B, FIG. 3 and FIG. 4) advantageously provides an extended left/right overlay adjustment range $r_{oa}$ of +/−3 mm (6 mm), outperforming the standard +/−1.6 mm found in conventional hinges. This upgrade not only facilitates a more efficient installation process but also saves time for cabinet door installers, as it often eliminates the need to adjust multiple doors when adjusting the gap between two doors. The 6 mm adjustment allows left/right overlay adjustment closer to the hinge cup 101.

Figure 14B:
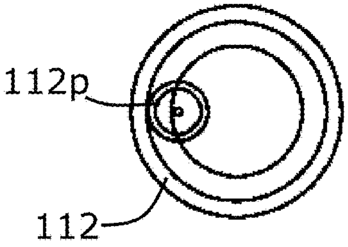
Figure 14C:
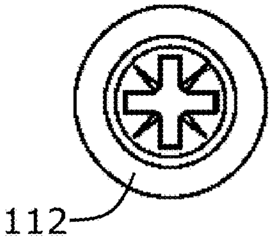

In an exemplary embodiment, the overlay adjustment screw 112 fastens the arm link 105 to the bottom plate 107. In particular, a narrow cylindrical post 112*p* of the overlay adjustment screw 112 (shown in FIGS. 14A, 14B) communicates through a rounded rectangular opening in the arm link 105 and is received by a circular aperture in the bottom plate 107. Rotation of the overlay adjustment screw 112 provides movement of the arm link 105 relative to the bottom plate 107, whereby a horizontal left/right overlay adjustment ($r_{oa}$) of about +/−3.0 (6 mm total) is permitted.

Figure 16:
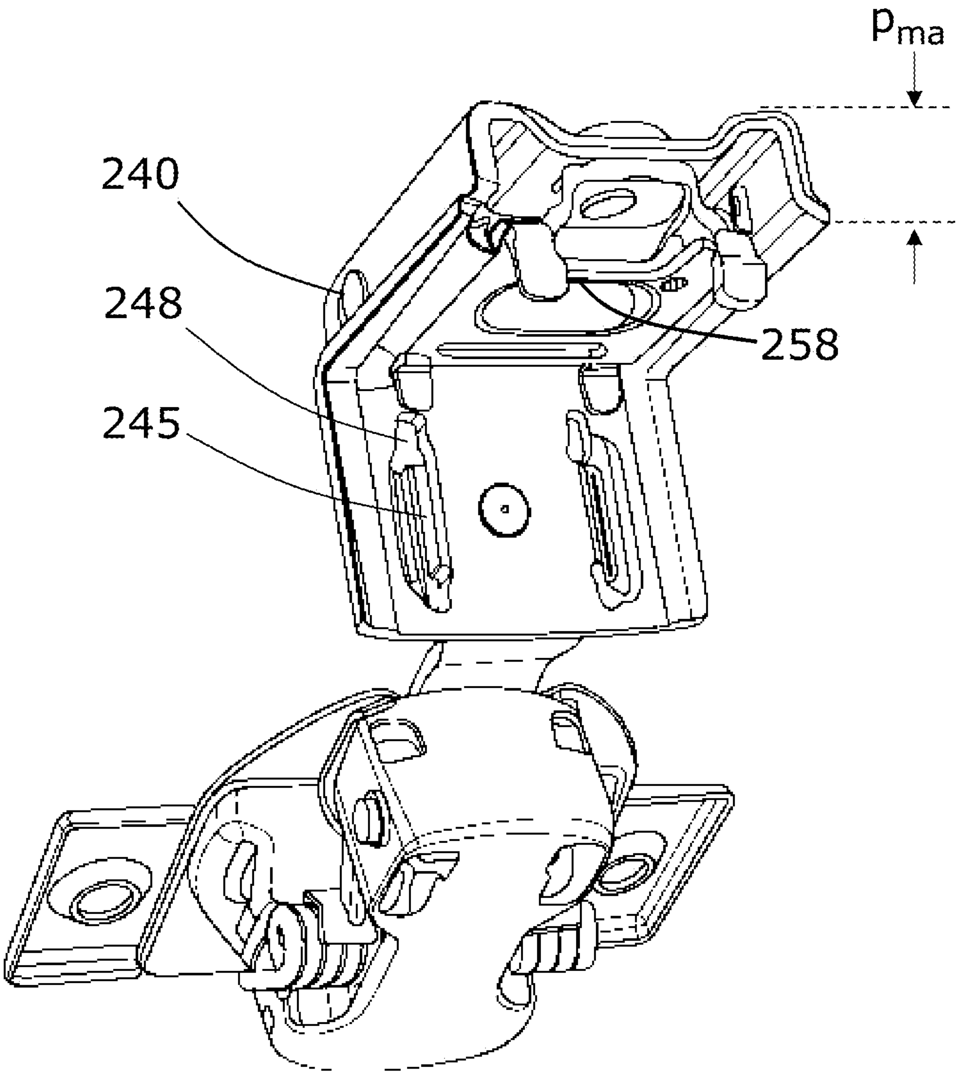
FIG. 16 (PRIOR ART)
FIG. 16 shows a conventional adjustable hinge, as known in the prior art.

The +/−3.0 overlay adjustment range ($r_{oa}$) advantageously relies on a wider arm link opening 402 of 12.4 mm ($w_{al}$ in FIG. 10B) and larger diameter overlay adjustment screw 112 (with a shaft 112*s* having a diameter of approximately 8.9 mm) compared those of the prior art (FIG. 16). This is made possible by eliminating the tabs 245 and channels 248 used by conventional hinges, such as those shown in FIG. 16. Further, eliminating the tabs 245 and channels 248 used by prior art hinges achieves greater structural integrity of the bottom plate 107.

Mounting Assembly

Figure 13A:
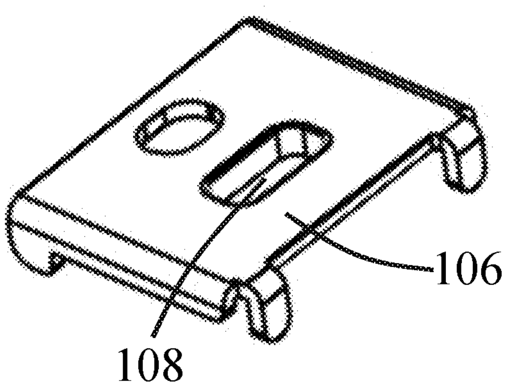
FIGS. 13A-13C illustrate views of a cover plate for covering the plate of the adjustable hinge, according to some implementations of the present disclosure.
Figure 13B:
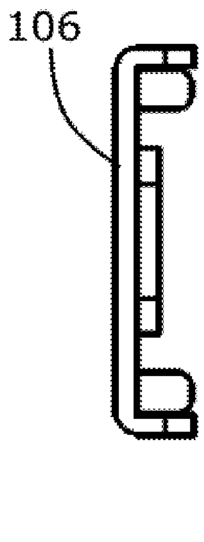
Figure 13C:
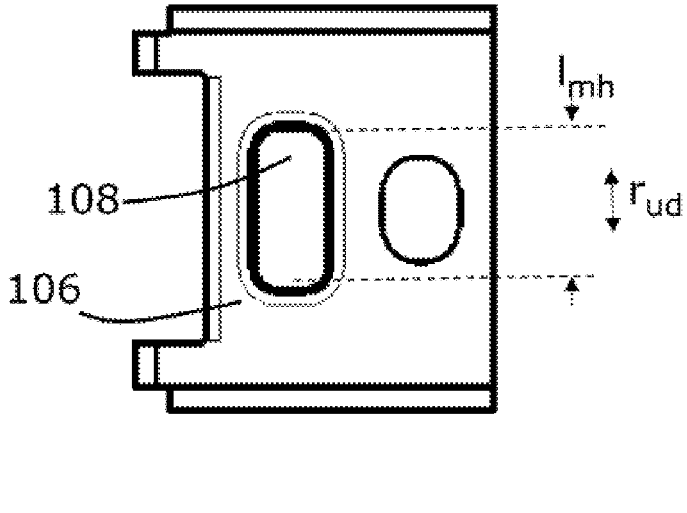

The components of the streamlined mounting assembly and corresponding in/out adjustment are most clearly shown in FIG. 1B, FIG. 2 and FIG. 13A. The mounting assembly relies on mounting adjustment screw 109 (also shown in FIG. 15A). Under the disclosed arrangement, a substantial portion of the area of the lower surface of the cover plate 106 runs parallel to and directly contacts the upper surface of the bottom plate 107 providing a streamlined design. Mounting hole 108 facilitates height adjustment. As most clearly seen in FIG. 1B and FIG. 13A, sides of the mounting hole 108 extend below the lower surface of the cover plate 106 forming a recess 108A around the perimeter for receiving the upper surface of the bottom plate 107. In the disclosed embodiment, the mounting hole 108 forms an opening 11.2 mm in length $l_{mh}$ (FIG. 13C), which accommodates an up/down adjustment range $r_{ud}$ of +−3.5 mm (7 mm total).

Mounting adjustment screw 109 fastens the cover plate 106 to the bottom plate 107. In particular, a narrow cylindrical post 109*p* of mounting adjustment screw 109 is received by a rounded rectangular opening in the cover plate 106 and circular aperture in the bottom plate 107. Rotation of the mounting adjustment screw 109 provides movement of the cover plate relative to the bottom plate, thereby permitting an in/out (or depth) adjustment range $r_{io}$ of about 2 mm for the door gap.

As shown in FIG. 1B, FIG. 3 and FIG. 5, the disclosed arrangement provides a streamlined mounting assembly design that boasts a minimal protrusion $p_{ma}$ of just 5.6 mm into the cabinet, providing additional clearance for the drawers inside compared to the conventional mounting plate assembly, which requires a mounting assembly protrusion $p_{ma}$ of 7.9 mm (FIG. 16). The streamlined mounting assembly arrangement and corresponding lower profile also provides a clearer view of the mounting hole 108, which makes it much easier to quickly identify and access the mounting hole 108 during installation thereby reducing installation time.

The streamlined mounting assembly design and improved visibility is made possible by reducing the profile to a flattened three-layer arrangement consisting only of the bottom plate 107, cover plate 106 and mounting adjustment screw 109. In contrast, as shown in FIG. 16, the adjustment feature of a conventional mounting plate assembly relies on components, such as a rivet 240, which must be accommodated into an additional layer, thereby requiring a mounting assembly protrusion ($p_{ma}$) of 7.9 mm.

Improved Damper Assembly

Figure 6:
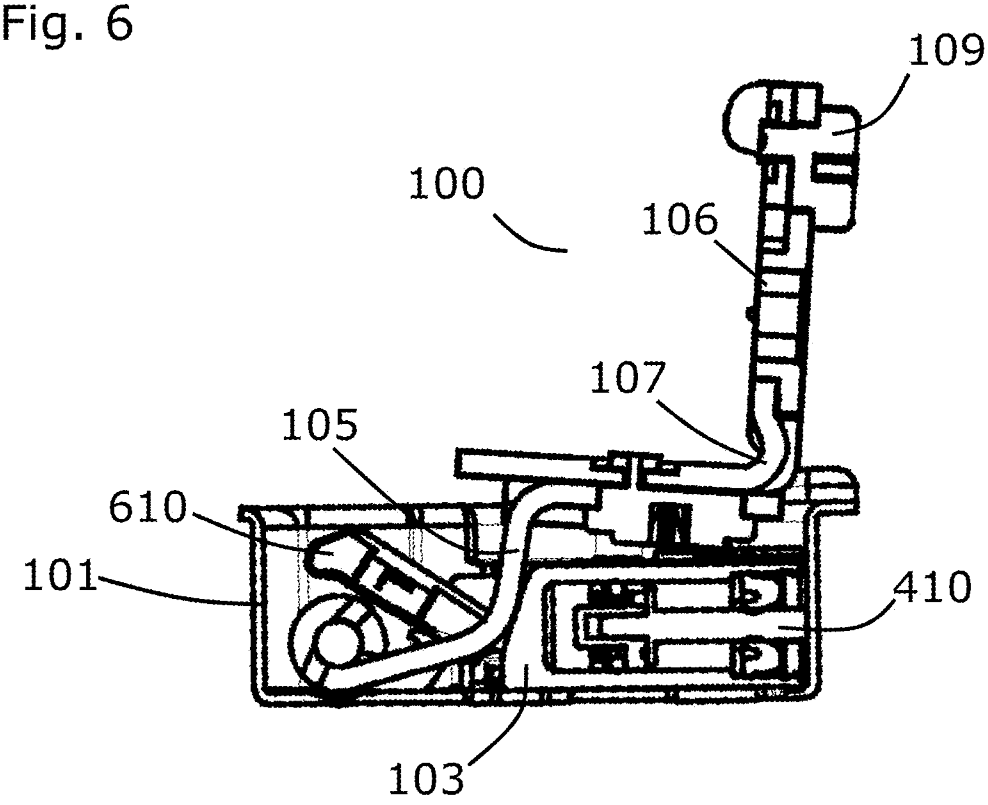
FIG. 6 illustrates a cross-sectional view of the adjustable hinge in the closed position along the line 6-6 illustrated in FIG. 4, according to some implementations of the present disclosure.
Figure 7A:
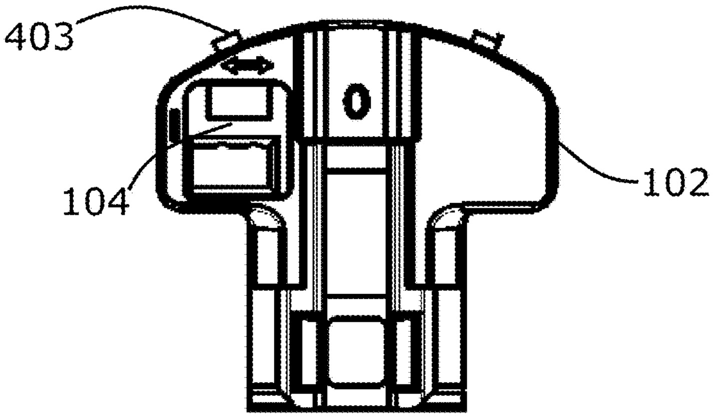
FIGS. 7A-7C illustrate views of a damper cover cap of the adjustable hinge, according to some implementations of the present disclosure.
Figure 7B:
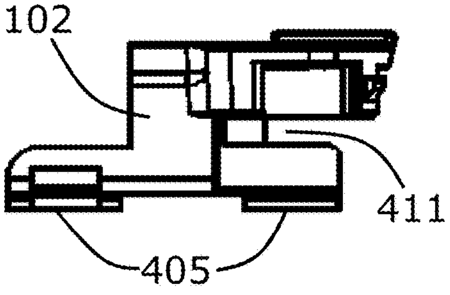
Figure 7C:
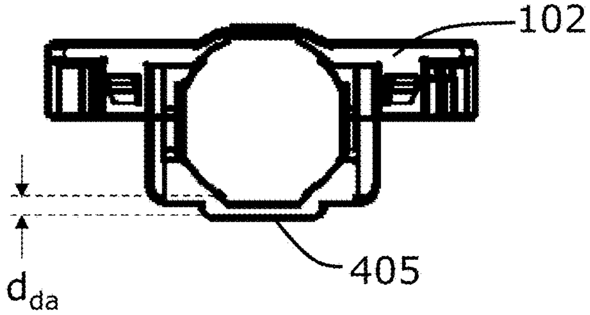

Referring to FIG. 2 and FIGS. 7A-7C, the adjustable hinge 100 further includes a damper cover cap 102, which is adapted to receive a damper 103. The damper cover cap 102 further includes an on-off damper switch 104 that allows the damper 103 to compress in response to the hinge arm link 105 pivoting from the open position to a closed position and/or decompress in response to the hinge arm link 105 pivoting from the closed position to the open position. When in the on-off damper switch 104 is OFF, the damper 103 does not decompress and is retained by the on-off damper switch 104 in its compressed state. FIG. 6 illustrates the damper 103 in its compressed state while in the adjustable hinge 100 is in the closed position. The damper 103 includes a connecting rod 410, which contacts a wall of the hinge cup.

As shown in FIG. 4, the hinge cup 101 may include one or more holes 401 to allow access to removing the damper cover cap 102 and the damper 103 from the hinge cup 101. The holes 401 also allow the damper cover cap 102 to latch onto the hinge cup 101; that is, tabs 403 of the damper cover cap 102 engage with the holes 401 to secure the damper cover cap 102 in the hinge cup 101. With this feature, different damper materials can be switched out and incorporated into the hinge cup 101 for different damping performance. The holes 401 can also dictate a position of the damper cover cap 102 in the hinge cup 101, allowing the damper cover cap 102 to sit in a lower position in the hinge cup 101.

Figure 8A:
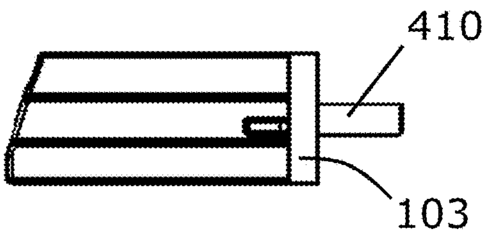
FIGS. 8A-8C illustrate views of a damper for the damper cover cap, according to some implementations of the present disclosure.
Figure 8B:
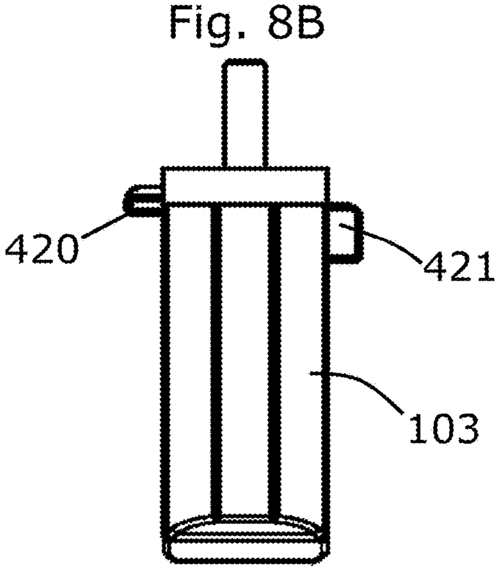
Figure 8C:
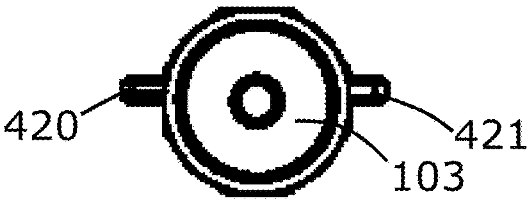
Figure 9:
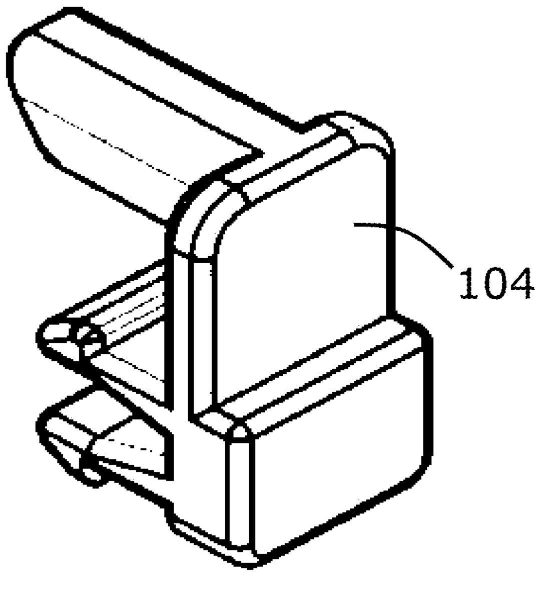
FIG. 9 illustrates an on-off switch for the damper cover cap of the adjustable hinge, according to some implementations of the present disclosure.

FIGS. 8A-8C show an embodiment of the damper. In some implementations, the damper 103 may be encapsulated and formed into a generally cylindrical shape. As shown most clearly in FIG. 8C, the top, bottom and sides of the damper 103 may be beveled or flattened such that the cross section resembles a hexagon. Such a cross section restricts lateral movement resulting in reduced vibration and less noise.

The damper 103 further includes guides 420, 421 for placing the damper 103 in the correct orientation of the damper cover cap 102. The guides 420, 421 are slidably received by channels 411 formed in the damper cover cap 102 and disposed substantially parallel to the bottom of the hinge cup 101. One of the guides 420 can also function as a catch for the on/off switch 104 to turn off damping as previously described. When installed, the damper does not rest on the bottom of the hinge cup 101, which would be the case in a conventional hinge. Instead, the damper 103 is seated 0.8 mm distance above (e.g., $d_{da}$ shown in FIG. 7C) and slides within the cover cap parallel to the bottom of the hinge cup 101, which advantageously reduces friction and noise level.

In another example, embodiments of the present disclosure provide manufacturing improvements to dampers for use in adjustable hinges. For example, the damper 103 and the damper cover cap 102 can snap out of the hinge cup 101 and can be replaced together. Further, the design allows for inserting the damper 103 into the cover cap 102 before inserting the entire damper assembly into the hinge cup 101. This differs from conventional hinge damper assemblies where a manufacturer must first insert the damper into the hinge cup before a damper cover is installed by sliding the cover over the damper.

Dimensions and Adjustment Ranges Compared to a Conventional Design

The shallow cup, overlay adjustment assembly, mounting assembly and damper assembly of the present application provide improvements over a conventional hinge (FIG. 16), leading to easier installation, and improved strength and reliability. Table 1 below summarizes the improvements described herein.

TABLE 1

| | Conventional Design (FIG. 16) | Present Application |
|---|---|---|
| Up/Down Adjustment Range ($r_{ud}$) | −/+3.2 mm | −/+3.5 mm |
| Overlay Adjustment Range ($r_{oa}$) | −/+1.6 mm | −/+3.0 mm |
| Mounting Assembly Protrusion ($p_{ma}$) | 7.9 mm | 5.6 mm |

While the present disclosure has been described with reference to one or more particular implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. An adjustable hinge for mounting a door on a cabinet frame comprising:

a hinge cup having a depth of no greater than 11.5 mm and opening angle of at least 103 degrees;

an arm link having a first end and a second end, the first end coupled to a rivet seated no more than 3.7 mm above a bottom surface of the hinge cup and configured to pivot relative to the hinge cup between an open position and a closed position;

a bottom plate adjustably coupled to the second end of the arm link by a first adjustment screw, whereby rotation of the first adjustment screw causes movement of the bottom plate relative to the arm link in a horizontal direction substantially parallel to a face of the cabinet frame; and a cover plate adjustably coupled to the bottom plate by a second adjustment screw, whereby rotation of the second adjustment screw causes movement of the cover plate relative to the bottom plate in a depth direction substantially perpendicular to the face of the cabinet frame.

2. The adjustable hinge of claim 1 further including a damper cover disposed within the hinge cup and a damper slidably received by the damper cover.

3. The adjustable hinge of claim 2, wherein the damper cover includes opposing channels disposed substantially parallel to the bottom of the hinge cup, the channel slidably receives opposing guides formed on the damper, wherein when the arm link pivots between an open position and closed position, the arm link contacts the damper and provides a force that pushes the damper toward a wall of the hinge cup to compress a connecting rod of the damper into the damper, wherein the bottom surface of the damper moves relative to, but does not contact, the bottom of the hinge cup.

4. The adjustable hinge of claim 3, wherein the damper cover includes at least one protrusion received by an aperture formed in the bottom surface of the hinge cup.

5. The adjustable hinge of claim 1, wherein the first adjustment screw includes a post disposed through an opening in the arm link and received by a first aperture in the bottom plate, and wherein the arm link opening is sized to permit at least 5.9 mm of movement of the bottom plate relative to the arm link in the horizontal direction.

6. The adjustable hinge of claim 5, wherein the bottom plate and cover plate form an adjustable mounting assembly with a thickness of no greater than 5.7 mm.

7. The adjustable hinge of claim 6, wherein the second adjustment screw includes a post disposed through an opening in the cover plate and received by a second aperture in the bottom plate, and wherein the cover plate opening is sized to permit at least 1.9 mm of movement of the bottom plate relative to cover plate in the depth direction.

8. The adjustable hinge of claim 7, wherein members of the adjustable mounting assembly consist only of the second adjustment screw, bottom plate, and cover plate.

* * * * *